United States Patent [19]
Hay et al.

[11] Patent Number: 5,449,219
[45] Date of Patent: Sep. 12, 1995

[54] SEAT ARRANGEMENTS PROVIDING ADJUSTABLE LUMBAR SUPPORT

[75] Inventors: Donald W. Hay, Hertfordshire; Brian Mitchell, Stonesfield, both of Great Britain

[73] Assignee: Youngflex, S.A., Fribourg, Switzerland

[21] Appl. No.: 119,155
[22] PCT Filed: Jan. 18, 1993
[86] PCT No.: PCT/GB93/00108
  § 371 Date: Jan. 11, 1994
  § 102(e) Date: Jan. 11, 1994
[87] PCT Pub. No.: WO93/13696
  PCT Pub. Date: Jul. 22, 1993

[30] Foreign Application Priority Data

Jan. 20, 1992 [GB] United Kingdom ............... 9201137
Jan. 20, 1992 [GB] United Kingdom ............... 9201138

[51] Int. Cl.⁶ ................... A47C 3/00; A47C 25/00
[52] U.S. Cl. ................... 297/284.4; 297/284.7
[58] Field of Search ................... 297/284.4, 284.7

[56] References Cited

U.S. PATENT DOCUMENTS

| | | | |
|---|---|---|---|
| 3,106,423 | 10/1963 | Schwarz | 297/284.4 |
| 4,725,095 | 2/1988 | Benson et al. | 297/284 |
| 5,026,116 | 6/1991 | Dal Monte | 297/284.4 |
| 5,197,780 | 3/1993 | Coughlin | 297/284.4 |

FOREIGN PATENT DOCUMENTS 0169293  1/1986  European Pat. Off. .

*Primary Examiner*—Peter R. Brown
*Assistant Examiner*—Anthony Barfield
*Attorney, Agent, or Firm*—Jacobson, Price, Holman & Stern

[57] ABSTRACT

An assembly for incorporation in a seat back to provide adjustable lumbar support comprises a platform element suspended by tension springs in a seat frame to support the cushioning of a back rest. The platform element has elongate lateral rails between which extend transverse wires that provide the platform support. A Bowden cable is linked between respective portions of each of the rails to apply a force of longitudinal compression, whereby the rails are caused to be hinged outwardly at an articulation point to vary the lumbar support provided by the transverse wires.

8 Claims, 5 Drawing Sheets

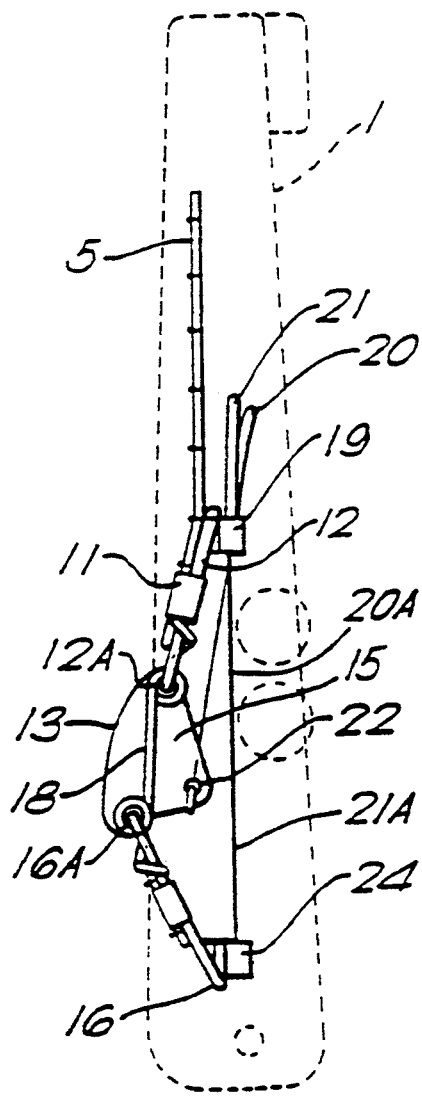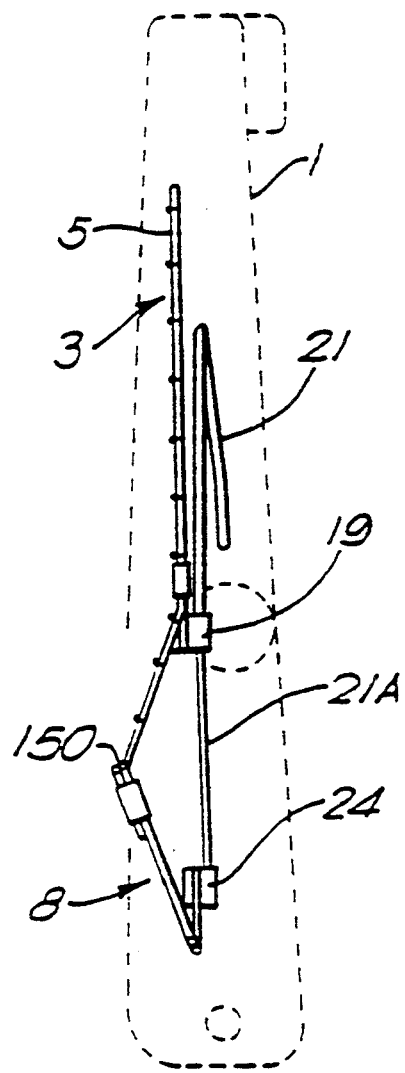

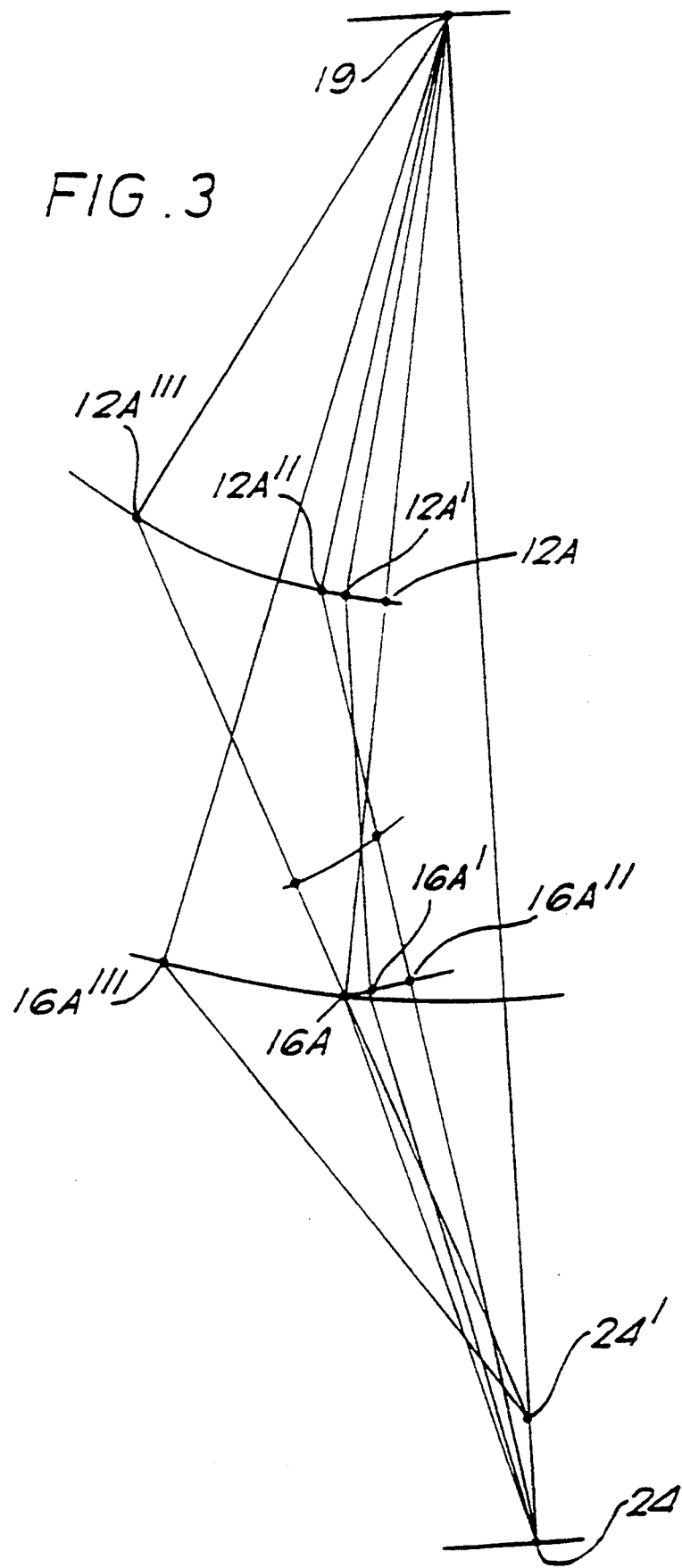

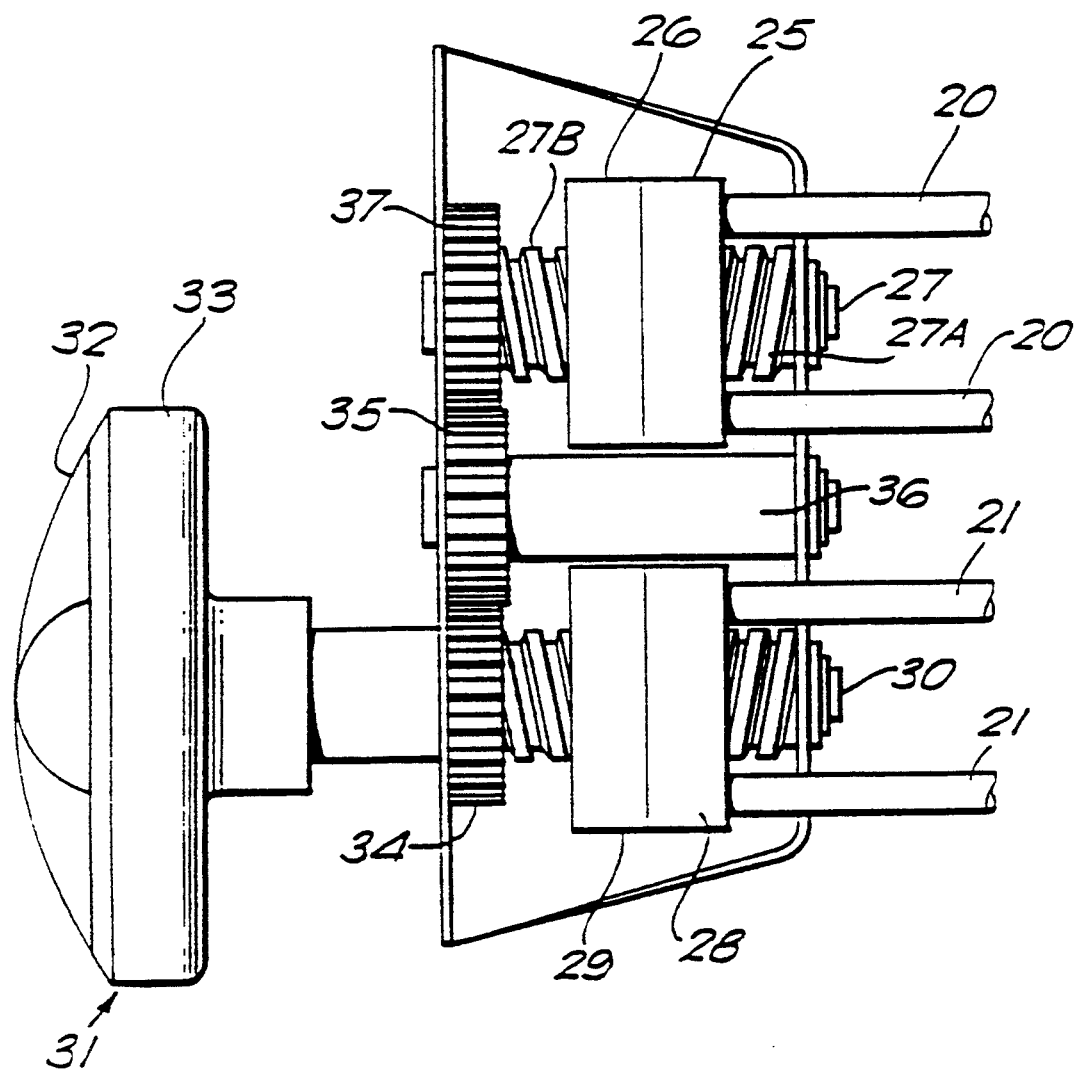

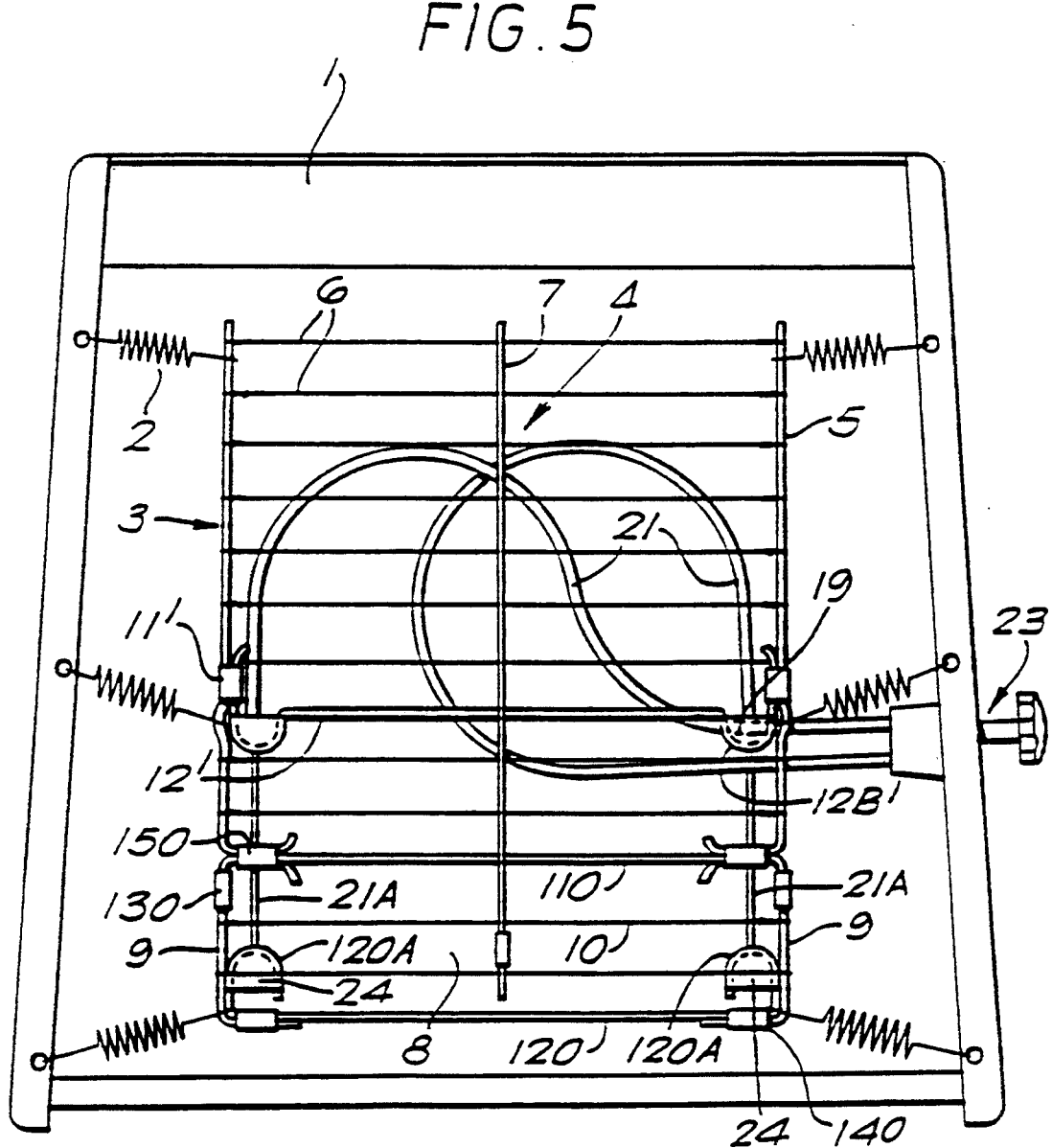

SEAT ARRANGEMENTS PROVIDING ADJUSTABLE LUMBAR SUPPORT

This invention concerns improvements in and relating to seat arrangements providing adjustable lumbar support, and more especially to a seat structure that is particularly adapted for use in an automobile seat of the kind wherein a platform element providing support for the upholstery of the seat is resiliently suspended in a seat frame.

It is known, see for example EP 0 169 293, that an assembly for incorporation in a seat back to provide adjustable lumbar support may comprise a platform element adapted to be suspended in a seat frame to support the cushioning of a back rest, said platform element including two elongate lateral rails between which extend transverse members that provide the platform support, adjustable means being linked between respective portions of each of said elongate rails to apply thereto a force of longitudinal compression, whereby said rails are caused to be arched outwardly in the lumbar region of the back rest together with the transverse members carried thereby.

Such an arrangement provides an adjustable and comfortable lumbar support which is of relatively simple design. It has the disadvantage, however, that the outward arching of the lumbar region of the back rest is required to be caused by flexing of the elongate lateral rails, which are of spring wire construction and must be of relatively heavy gauge to support the bending forces applied thereto by tension springs supporting the arrangement in the seat frame and which are required to carry load placed upon the platform element. Thus a relatively high force of longitudinal compression is required to cause the arching of the lateral rails, particularly when the platform element is providing minimum lumbar support and is in a relatively flat condition. Correspondingly heavy forces are thus placed upon the adjusting arrangement, which must be linked between the extreme ends of the lateral rails to give the maximum mechanical advantage in applying a bending force to the rails. The places a limitation upon the available types of adjusting mechanism that can be used, as well as requiring a significant space for the adjusting arrangement within the back rest itself.

It also has the further disadvantage, however, that although the degree of lumbar support can be readily adjusted in the horizontal direction, the vertical position at which lumbar support is provided is determined by the initial geometrical shape of the platform element and the points at which the compression forces are applied to the lateral rails, so that it is impossible for an occupant of the seat to adjust the lumbar support in a vertical direction to meet individual requirements.

Other known systems are available to provide for vertical adjustment of lumbar support, but these have the disadvantage that they are not adaptable to the particular arrangement initially referred to. Also, such known systems require that a support element scuff up and down on the back of the cushioning of the back rest, so that some form of additional sliding interface is necessary to allow free movement of the vertically adjustable support means.

It is a general object of the invention to provide an improvement on an assembly of the kind initially referred to.

It is a preferred object of the invention to overcome, or at least reduce one or more of the above mentioned disadvantages.

In accordance with one aspect of the invention, this object is achieved in that the said lateral rails are provided with a hinged articulation point in the region of lumbar support, whereby outward arching of the rails is effected by bending of the platform element in the form of a ridge.

Surprisingly, it has been found that despite the fact that the outward arching of the platform element forms a ridge or apex of increasingly acute angle, this does not, as might be expected, cause discomfort to the occupant of the seat, provided that the contouring of the platform element and the cushioning supported thereby are appropriately adapted to their purpose.

Preferably the lateral rails are freely hinged together in such a manner that they present a minimum restoring force tending to resist arching, and the platform element is suspended in the back rest in such a manner that the suspension springs themselves provide the restoring force tending to return the lateral rails towards a rectilinear condition.

As arrangement in accordance with this aspect of the invention the invention has the advantage that an adjustment mechanism is required to exert little force upon the platform element and may be linked between points on the lateral rails that are relatively closely spaced, i.e. not at the two extreme ends of the rail. This enables an adjusting mechanism such as a Bowden cable linkage to be used, such a linkage offering the advantages of economy, simplicity and versatility.

Another aspect of the invention provides an assembly for incorporation in a seat back to provide adjustable lumbar support, comprising a platform element adapted to be suspended in a seat frame to support the cushioning of a back rest, said platform element including two elongate lateral rails between which extend transverse members that provide the platform support, wherein said platform element includes a transverse lumbar region that is articulated together with said rails in the manner of a trapezium linkage in order to enable variation of the angular attitude of said lumbar region relatively to the base of the trapezium, and said lumbar region is linked to adjusting means for varying the angle thereof relatively to an adjacent section of the platform element, the arrangement being such that said variation of said angle causes a vertical displacement of the effective position of lumbar support.

In accordance with one embodiment of the invention, the said lumbar region of the supporting platform may be formed by a separate rocket panel that is pivotally linked between the rails of upper and lower platform sections, the rocker panel having an appropriately contoured surface in the vertical section, whereby the vertical position of the effective lumbar support provided thereby is varied with the angular attitude of the rocker panel.

Further preferred features and advantages of the invention will become apparent from the following description taken in conjunction with the drawings, in which:

FIG. 2 is a side elevation of the assembly illustrated in FIG. 1 with the relative position of the supporting frame illustrated in broken lines for reference;

FIG. 3 is a geometric diagram illustrating the effective ranges and positions of adjustment of the assembly as illustrated in FIGS. 1 and 2, FIG. 4 is a side elevation illustrating an alternative arrangement for providing adjustment of the assembly of FIGS. 1 and 2.

FIG. 5 is a front elevation of the back rest of a seat incorporating an assembly according to the invention for providing adjustable lumbar support, and FIG. 6 is a diagrammatic side elevation illustrating the geometrical arrangement of the platform element of the assembly of FIG. 1.

Figure 1:
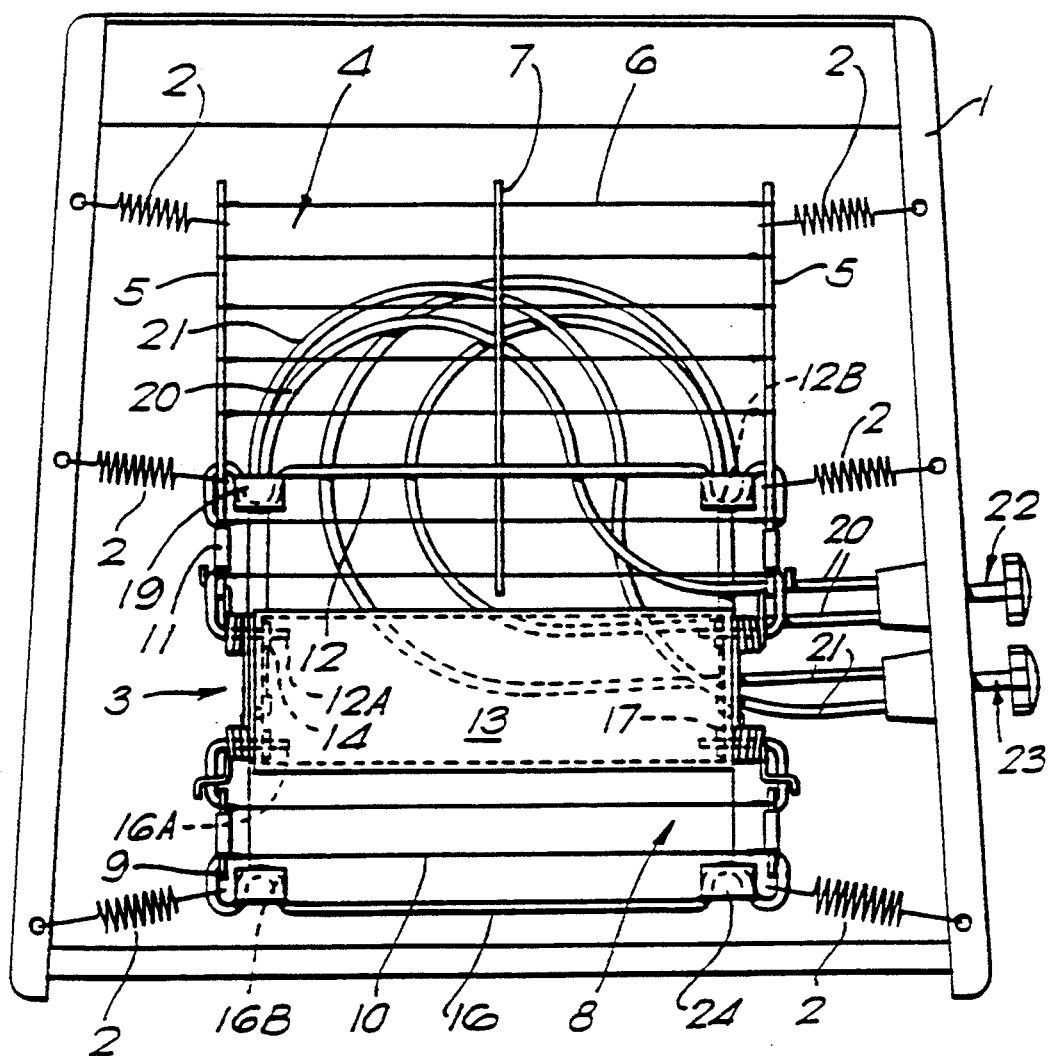
FIG. 1 is a front view of an assembly in accordance with the invention, shown suspended in the frame of a back rest of a vehicle seat.

Referring to FIG. 1 and 2 of the drawings, there is illustrated the frame 1 of a seat back for the seat of an automobile. Suspended within the frame by means of tension springs 2 is an assembly, indicated generally at 3, that serves as a platform element for supporting the cushioning and upholstery of the vehicle seat back. The platform element 3 comprises an upper section 4 consisting of two generally vertical lateral rails 5 formed by paper-wrapped steel cords between which are tensioned transverse wires 6 penetrating an intermediate vertical cord 7. Such a construction is well known in the art, and a lower section 8 of the pad is formed in similar manner from paper wrapped cords 9 and transverse wires 10.

Secured to the upper section 4 by means of clips 11 embracing the rails 5 is a sub frame 12 of formed wire, inturned ends 12A of which form pivots for a rocker panel 13. In the illustrated embodiment this is formed as a flanged sheet metal pressing although it could be formed by moulding from synthetic plastics material. Synthetic plastics bushes 14 secured within flanges 15 of the rocker panel 13 serve as journals for engagement by the ends 12A of the sub frame.

In a similar manner, the lower section 8 is provided with a sub frame 16 in turned ends 16A of which engage in bushes 17 supported in the flange 15.

The two sub frames 12 and 16 are spring biased relatively to the rocker panel 13 by means of double acting torsion springs 18, each of which extends around both of the adjacent inturned ends 12A and 16A of the respective sub frames, the springs 18 serving to bias the assembly so that the sections 4 and 8 and the rocker panel 13 are urged towards the relative angular positions illustrated in FIG. 2.

The sub frame 12 is formed to include U-shaped loops 12B within which are anchored double-socket ferrules 19 for the connection of two pairs of Bowden cables 20 and 21 respectively. Each pair of cables is associated with a common actuating means 22, 23 respectively, which will be described in more detail below.

An actuating cable 20A (FIG. 2) of each Bowden cable 20 is anchored to a corresponding flange 15A of the rocker panel 13, at 22. Likewise, an actuating cable 21A (FIG. 2) of each Bowden cable 21 is connected to an anchorage 24 supported in a U-shaped loop 16B of the sub frame 16.

Since the springs 18 cause the rocker panel 13 to be biased about the pivots 16A in a clockwise direction as viewed in FIG. 2 and to be biased about the pivots 12A in a clockwise direction as viewed in FIG. 2, the arrangement is such that when, starting from the position shown in FIG. 2, the Bowden cable 20 is contracted to reduce the distance between the ferrules 19 and the anchorages 22, the rocker panel 13 is pivoted in the anti-clockwise direction to vary its attitude relatively to the vertical plane, whereas when the Bowden cables 21 are contracted to reduce the distance between the anchorages 24 and the ferrules 19, the trapezium linkage formed by the sub frames 12 and 16 and the rocker panel 13 is caused to arch outwardly to the left as viewed in FIG. 2. Upon release of the respective Bowden cables, the springs 18 will tend to return the assembly to the position of FIG. 2.

Thus, by means of the controls 22 and 23 the platform element 3 can be adjusted to provide a variety of configurations of lumbar support, as can be seen more clearly by reference to the diagram of FIG. 3.

In FIG. 3 the linkage points are given the same reference numerals as in FIG. 2, and thus the figure defined by the points 19,24,16A, and 12A shows the attitude of the arrangement as in FIG. 2, in which the lumbar support is effectively provided at the point 16A. By control of the actuating means 20 the rocker panel 13 can be tilted progressively to provide a range of adjustment in which the points 12A and 16A are moved through the positions 12A',16A' to positions 12A'',16A'' at which the lumbar support is provided at the point 12A''. The contour of the panel 13 is such that this has the effect of moving the lumbar support progressively through the vertical distance between the points 16A and 12A''.

Starting from the position in FIG. 2, control of the actuating means 21 can move the point 24 vertically relatively to the point 19, to the position 24', giving a range of horizontal adjustment of the lumbar support between the points 16A and 16A'''. Control of the actuating means 20 can then be used, as already described, to move the lumbar support vertically from the point 16A''' to the point 12A'''.

FIG. 4 illustrates an arrangement for actuating the Bowden cable linkages 20 and 21 as described above. The outer sheath of each of the cables 20 is received in a ferrule block 25, whereas the internal cables 20A are connected to a further block 26. The blocks 25 and 26 are in screw threaded engagement with a lead screw 27 having left and right handed screw sections 27A and 27B respectively. Thus rotation of the lead screw 27 is effective to cause the blocks 25 and 26 to be moved towards or away from one another in order to actuate the Bowden cables 20 in the sense required.

The Bowden cables 21 are connected in a similar manner to blocks 28 and 29 located upon a similar lead screw 30.

The lead screws 27 and 30 can be actuated by means of a two-part control knob 31, an inner portion 32 of which is fixed directly to the lead screw 30 and is provided with appropriate finger recesses, not shown, to facilitate rotation, and an outer circumferential portion 33 of which is coupled to a spur gear 34 that is freely rotatable about an unthreaded section of the lead screw 30.

The spur gear 34 is coupled via an idler gear 35 mounted on a rotary shaft 36, to a further spur gear 37 that is fixed to the lead screw 27.

Thus the arrangement is such that by manipulation of the section 32 of the control knob, an occupant of the seat can vary the degree of lumbar support in the horizontal direction by means of the Bowden cables 21, whereas by independent rotation of the outer circumference 33 of the control knob the Bowden cables 20 can be actuated to provide vertical adjustment of the point of lumbar support.

It will be appreciated that various alterations and modifications may be made to the arrangement described above without departing from the scope of the invention. Thus, in place of the two-part control knob 31, separate control knobs may be independently connected to the lead screws 27 and 30 as illustrated in FIG. 1.

If desired, the trapezium linkage illustrated in FIGS. 1 and 2 may be provided with stop means for preventing the linkage from snapping over centre under load applied to the seat. Thus, for example, the rocker panel 13 may be provided with an extended lug for engagement against the sub-frame 12 in order to limit the range of movement of the rocker panel 13 relatively thereto, so that the pivot points 12A cannot pass over centre between the points 16A and the points 19.

Referring to FIGS. 5 and 6 of the drawings there is shown another embodiment of the invention wherein like parts are indicated with the same reference numerals as in FIGS. 1–4 and thus will not be described again in detail. In this arrangement the rocker panel 13 is omitted and additional transverse wires 110 and 120 of heavier gauge than the wires 10 are connected between the wires 9 by means of clips 130 and 140 to complete a rectangular outer frame of the lower section 8.

Clips 150 secure the transverse wire 110 to inturned ends of the cords 5, whereby the clips 15 serve as hinges that allow the two sections 4 and 8 of the platform element to be hinged relatively to one another about the transverse wire 110.

The transverse wire 120 has hooked ends 120A that serve as anchorages for the grooved blocks 24 that fit within the hooks 120A and are anchored to the ends of Bowden cables 21A.

In a similar manner to the arrangement of FIGS. 1–4, a further transverse steel wire 12' is connected between the cords 5 by means of clips 11' and has looped portions 12B' that serve to retain the grooved blocks 19 forming ferrules for the outer sleeves 21 of the Bowden cables.

Referring to FIG. 2, it will be seen that the lower section 8 of the platform element and the lower sections of cords 5 extending between the ferrules 19 and the clips 150 form a triangular ridge, the base of the triangle being defined by the portions of Bowden cable 21A extending between the anchorages 24 and ferrules 19. The Bowden cables 21A are held under slight tension by means of the tensions springs 2 that anchor the platform element 3 in the seat frame 1, and thus the angle of the apex of the triangular ridge is determined by the length of the Bowden cables 21A extending between points 24 and 19, which distance can be adjusted by manual actuation of the mechanism 23.

It will thus be seen that effective adjustment of the degree of horizontal lumbar support provided by the platform element 3 can be achieved in a simple manner by the mechanism 23 without the need for the mechanism to exert significant force upon the platform element 3, and without the need for the adjusting mechanism to extend to the full height of the platform element 3. Thus a relatively compact simple and economical adjusting mechanism can be used.

We claim:

1. An assembly for incorporation in a seat back to provide adjustable lumbar support comprising a platform element adapted to be suspended in a seat frame to support the cushioning of a back rest, said platform element including two elongate lateral rails between which extend transverse members that provide the platform support, and adjustable means extending between upper and lower portions of each of said elongate rails to apply thereto a force of longitudinal compression, whereby said rails are caused to be arched outwardly in the lumbar region of the back rest together with the transverse member carried thereby, and wherein said platform element includes a transverse lumber region that is articulated between said upper and lower portions of said rails about spaced, parallel transverse axes, in order to enable variation of the angular attitude of said lumbar region in a vertical plane, and said lumbar region is connected to a second adjusting means for varying the angle on the platform element of said lumbar region relatively of upper and lower region of the platform element, the arrangement being such that said variation of said angle causes a vertical displacement of the effective position of lumbar support.

2. An assembly according to claim 1 wherein said lumbar region of the platform element is formed by a separate rocker panel that is pivotally linked between the rails of upper and lower platform resections (4,8), the rocker panel having a surface that is outwardly convex in the vertical section, whereby the vertical position of the effective lumbar support provided thereby is varied with the angular attitude of the rocker panel.

3. An assembly according to claim 1, wherein said platform element comprises a transversely flexible pad member supported in the back rest portion of a seat frame by means of tension springs linked between an outer periphery of the said frame (1) and the said rails of the platform element.

4. An assembly according to claim 3, wherein said adjustable means comprises Bowden cable means linked between articulated portions of said rails and coupled to first actuating means mounted in the seat frame.

5. An assembly according to claim 4, characterized in that relatively articulated portions (4,8) of the said pad member (3) are respectively of major and minor dimension, and that the Bowden cable means (21,21A) are inked between a transverse axis adjacent that end of the minor portion (8) which is remote from the point of articulation (16A,150) and a transverse axis that is intermediate the ends of the major portion (4), the said rails (5) being angled outwardly from said intermediate transverse axis towards the said point of articulation to promote hinging of the pad member thereat.

6. An assembly according to claim 5, wherein each of said first and second actuating means comprises a screw threaded shaft having oppositely screw threaded sections upon which are respectively located correspondingly threaded blocks anchored to outer and inner elements of the Bowden cable means.

7. An assembly according to claim 6, wherein each said screw threaded shaft is coupled to a manual knob.

8. An assembly according to claim 4 wherein Bowden cable means are linked between said lumbar region and an adjacent, relatively articulated portion of said platform element and coupled to second actuating means mounted in the seat frame.

* * * * *

UNITED STATES PATENT AND TRADEMARK OFFICE
CERTIFICATE OF CORRECTION

PATENT NO. : 5,449,219
DATED : September 12, 1995
INVENTOR(S) : Donald W. HAY, Brian MITCHELL It is certified that error appears in the above-indentified patent and that said Letters Patent is hereby corrected as shown below:

Column 2, line 24, "As" should read --An--; line 25, "invention the invention" should read --invention--; line 52, "rocket" should read --rocker--. Column 3, line 37, "in turned" should read --inturned--. Column 5, line 45, "tensions" should read --tension--. Column 6, line 8, "member" should read --members--; line 14, "means" should read --means on the platform element--; line 15, "angle on the platform element" should read --angle--; line 16, "of upper" should read --to upper--; "region" should read --regions--; line 23, "resections (4,8)" should read -- sections--; line 33, "frame (1)" should read --frame--; line 51, "claim 5" should read --claim 8--.

Signed and Sealed this

Ninth Day of July, 1996

*Attest:*

BRUCE LEHMAN

*Attesting Officer*     *Commissioner of Patents and Trademarks*